Aug. 28, 1956  B. G. SIEBRING  2,760,328
CORD CARRYING ARM FOR REMOTE CONTROL LAWN MOWER
Filed Dec. 18, 1953  2 Sheets-Sheet 1

INVENTOR.
BARTON G. SIEBRING
BY
McMorrow, Berman & Davidson
ATTORNEYS

Aug. 28, 1956   B. G. SIEBRING   2,760,328
CORD CARRYING ARM FOR REMOTE CONTROL LAWN MOWER
Filed Dec. 18, 1953   2 Sheets-Sheet 2

INVENTOR.
BARTON G. SIEBRING
BY
McMorrow, Berman & Davidson
ATTORNEYS

United States Patent Office 2,760,328
Patented Aug. 28, 1956

2,760,328

CORD CARRYING ARM FOR REMOTE CONTROL LAWN MOWER

Barton G. Siebring, McAllen, Tex.

Application December 18, 1953, Serial No. 398,936

5 Claims. (Cl. 56—26)

This invention relates to a cord carrying means for a remote control lawn mower.

An object of the present invention is to provide a remote control lawn mower in which there is a means for supporting and maintaining the current supplying cord free of entanglement under all conditions of operation of the mower.

Another object of the present invention is to provide a remote control lawn mower wherein there is a member which is freely movable in response to the turning traveling movements of the mower to shift the cord and maintain such cord entirely clear of the mower during operation.

A further object of the present invention is to provide a remote control lawn mower with a cord carrying member which is simple in structure, and highly efficient and commercially practical in action.

Other objects and advantages of the present invention will become apparent from the following description taken in conjunction with the accompanying drawings, in which.

Figure 1:
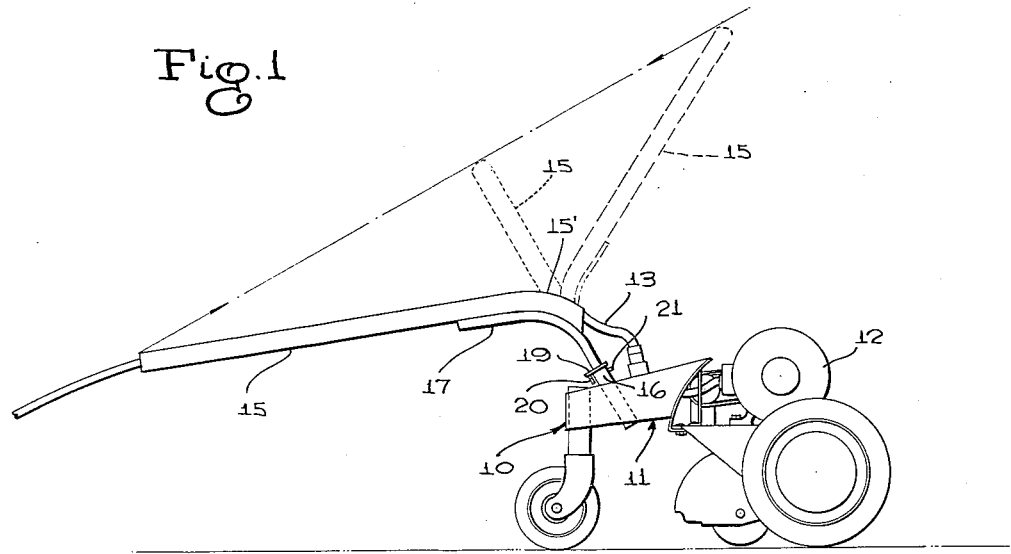
Figure 1 is a side elevational view of a remote control lawn mower equipped with the cord carrying arm of the present invention, the full line indicating the normal position of such arm and the dotted lines indicating an intermediate and the extreme positions of such arm upon turning movements of the mower.

Referring to the drawings, the numeral 10 designates a remote control lawn mower having a wheeled frame 11 which is driven by the power means or motor 12. A remote control current conducting cable or cord 13 has one end 14 operatively attached to the power means 12. As the lown mower is of the old and conventional type, no specific description thereof appears necessary.

Figure 4:
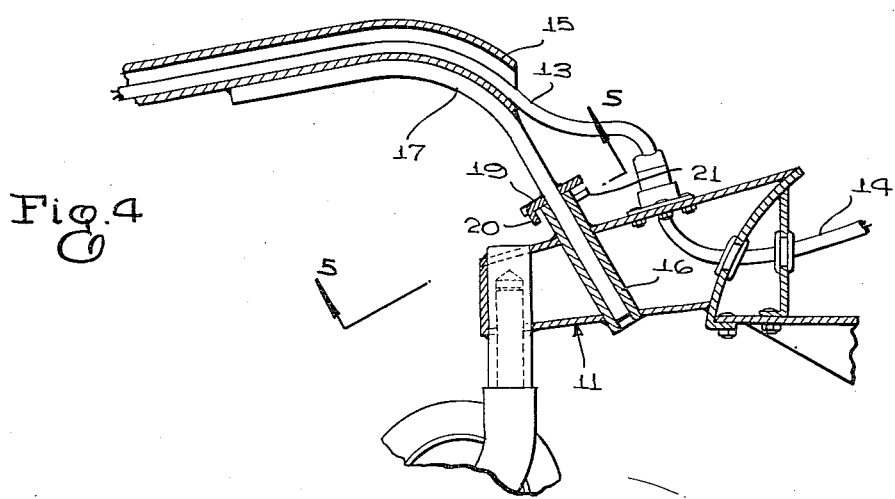
Figure 4 is an enlarged fragmentary sectional view taken along the line 4—4 of Figure 2.
Figure 5:
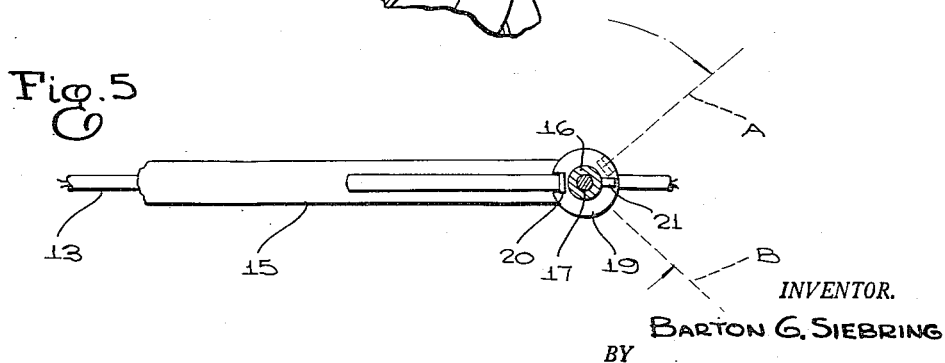
Figure 5 is a sectional view taken along the line 5—5 of Figure 4, the dotted lines indicating the two limits of rotational movement of the cord carrying arm.

Arranged above and longitudinally of the wheel frame 11 and spaced from the attached end 14 of the cord 13 is an arm 15 which freely supports a portion of the cord 13 adjacent such attached end, the arm being connected to the frame 11 for rotational movement about an upright axis disposed at an acute angle with respect to the frame. Specifically, the arm 15 is in the form of a hollow open ended tube, the tube being arcuately bent at the portion adjacent the end contiguous to the attached end of the cord 13. As will be apparent from Figures 1 and 4, an upright socket 16 is disposed at an acute angle with respect to the frame 11 and to the ground and is fixedly carried by the latter frame, the socket being spaced from and facing away from the attached end of the cord 13. The arcuately bent end portion 15' of the hollow tube is connected to the socket 16 for rotational movement about such socket as an axis by means of an upstanding circular bar 17, the upper end of which is exteriorly of and fixedly attached to the arcuately bent end portion of the tube with the lower end portion of the bar being loosely received within the socket 16. An annular flange 19 is carried by the bent end portion of the bar 17 and bears against the top of the socket 16 to prevent the bar from sliding through the socket. By virtue of the lower end portion of the bar 17 being loosely received within the socket 16, the tube or arm 15 is freely rotatable about the socket as an axis. The portion of the cord 13 adjacent the attached end thereof extends slidably through the tube or arm 15, as clearly shown in Figure 4. Cooperating stop means are provided on the flange 19 and the socket 16 for limiting the rotation of the arm 15 forwardly in both the clockwise and counterclockwise direction from the normal rearwardly pointing low position, the position shown in full lines in Figures 1 and 2. Such stop means embodies a lug 20 depending from the flange 19, Figures 4 and 5, and a pin 21 projecting from the socket 16. The lug 20 is centered laterally with respect to the center line of the bar 17, and is of such length as to permit the arm 15 to swing through an arc of approximately 270°, that is, 135° forward in both the clockwise and counterclockwise direction from the normal rearwardly pointing low position. The angle through which the arm 15 swings is not critical, since it may vary depending upon the location of the socket with respect to the frame 11. It is important, however, that the arcuate path of movement of the arm 15 be arrested before cutting across the path of travel of the mower, that is, past the front wheels. Therefore the size of the lug 20 and pin 21 are governed accordingly.

Figure 2:
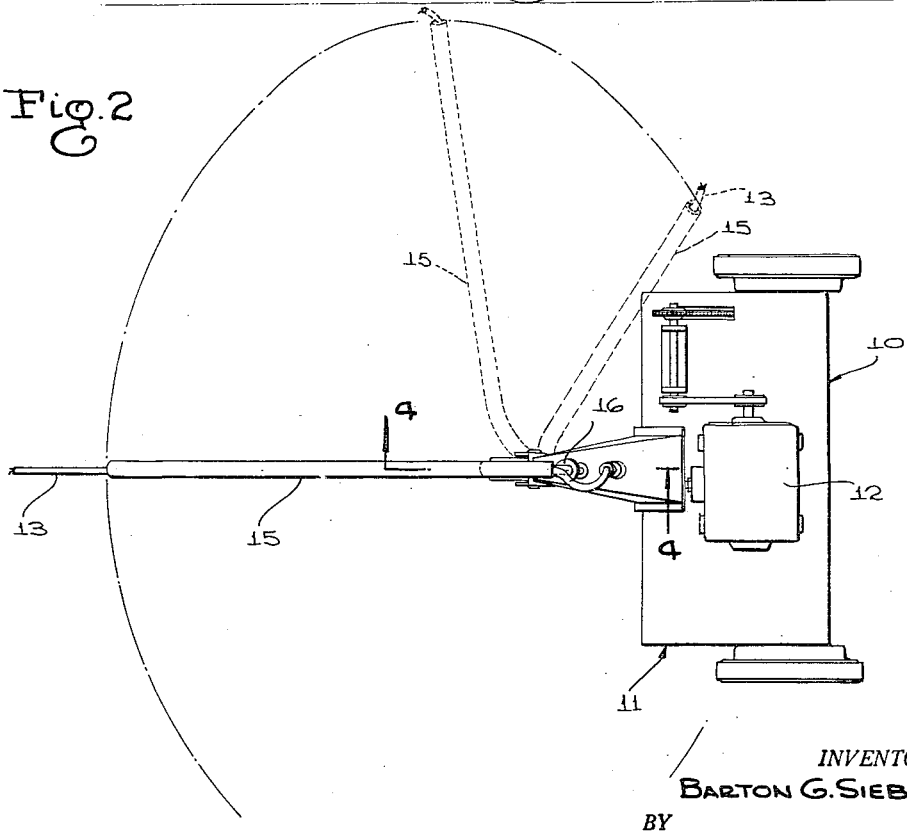
Figure 2 is a plan view of the assembly of Figure 1.
Figure 3:
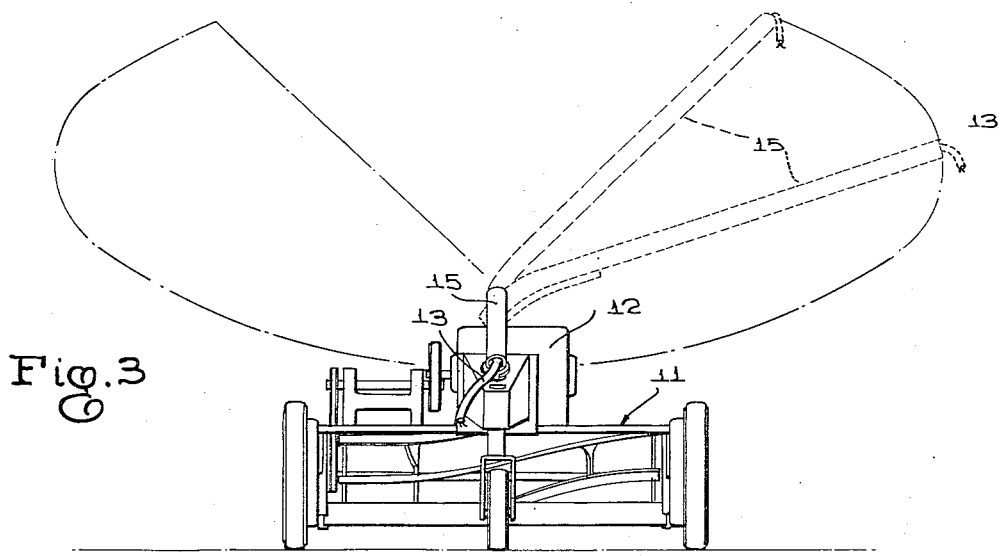
Figure 3 is a rear elevational view of the assembly of Figure 1.

In operation of the remote control lawn mower, the arm or tube 15 is in its normal rearwardly pointing position with respect to the ground surface, as depicted in full lines in Figures 1 and 2, when the mower is traveling in a straight course and it retains this position as long as the mower travels along such course. When the mower is caused to effect a turning movement in either direction, the arm or tube 15, by virtue of its loose mounting in the socket 16, simultaneously executes its rotational movement about the socket as an axis. This causes the outer end of the arm or tube 15 to rise gradually to an intermediate or extreme position in one direction. The execution, partial or complete, of the rotational movement of the arm or tube is, of course, in response to the turning traveling movements of the wheeled frame 11. Because of the cooperating lug 20 and pin 21 the rotational movement of the arm or tube 15 is restricted to an arc of 270°, the limits of such movement being indicated by the dotted lines designated A and B respectively, in Figure 5. When the mower is executing a complete turn of 180° the arm or tube 15 is moved through an arc of 135°, during which period of movement the cord 13 is gradually elevated away from the ground to its highest position. The rotation of the arm 15 with respect to the mower is then arrested by engagement of the lug 20 striking the pin 21. As the mower completes its turn through the remaining 450° of the 180° turn, the arm rotates with respect to the ground to swing the cord out of the path of the mower, as the mower begins its travel in the reverse direction. The friction of the cord 13 dragging on the ground then pulls the arm 15 back to its normal rearwardly pointing low position.

Having fully described the invention, what I claim as new and desire to secure by Letters Patent is:

1. In a mower having a wheeled frame and a cutting means operatively mounted therein, power means on said frame for driving the latter, and a remote control current conducting cord having one end operatively attached to said power means, an arm arranged above and longitudinally of said frame and spaced from the attached end of said cord freely supporting a portion of said cord adjacent such attached end and connected to said frame for rotational movement about an upright axis disposed at an acute angle with respect to said frame, said arm being freely rotatable about said axis in response to turning traveling movements of said frame.

2. In a mower having a wheeled frame and a cutting means operatively mounted therein, power means on said frame for driving the latter, and a remote control current conducting cord having one end operatively attached to said power means, an arm arranged above and longitudinally of said frame and spaced from the attached end of said cord freely supporting a portion of said cord adjacent such attached end and connected to said frame for rotational movement about an upright axis disposed at an acute angle with respect to said frame, said axis facing away from the attached end of said cord, said arm being freely rotatable about said axis in response to turning traveling movements of said frame.

3. In a mower having a wheeled frame and a cutting means operatively mounted therein, power means on said frame for driving the latter, and a remote control current conducting cord having one end operatively attached to said power means, a hollow open ended arm arranged above and longitudinally of said frame and spaced from the attached end of said cord slidably receiving the portion of said cord adjacent such attached end and having the open end contiguous to the attached end of said cord connected to said frame for rotational movement about an upright axis disposed at an acute angle with respect to said frame, said axis facing away from the attached end of said cord, said arm being freely rotatable about said axis in response to turning traveling movements of said frame.

4. In a mower having a wheeled frame and a cutting means operatively mounted therein, power means on said frame for driving the latter, and a remote control current conducting cord having one end operatively attached to said power means, an upright socket disposed at an acute angle with respect to said frame and fixedly secured to the latter frame, said socket being spaced from and facing away from the attached end of said cord, and a hollow open ended tube arranged above and longitudinally of said frame slidably receiving a portion of said cord adjacent the attached end thereof and having one end connected to said socket for rotational movement about said socket as an axis, said arm being freely rotatable about said socket in response to turning traveling movements of said frame.

5. In a mower having a wheeled frame and a cutting means operatively mounted therein, power means on said frame for driving the latter, and a remote control current conducting cord having one end operatively attached to said power means, an upright socket disposed at an acute angle with respect to said frame and fixedly secured to the latter frame, said socket being spaced from and facing away from the attached end of said cord, a hollow open ended tube arranged above and longitudinally of said frame slidably receiving a portion of said cord adjacent the attached end thereof and having one end connected to said socket for rotational movement about said socket as an axis, said arm being freely rotatable about said socket in response to turning traveling movements of said frame, and cooperating stop means on said socket and said arm for limiting the rotational movement of said arm in either direction.

References Cited in the file of this patent

UNITED STATES PATENTS

| | | |
|---|---|---|
| 557,809 | Hogeland | Apr. 7, 1896 |
| 1,546,981 | Harris | July 21, 1925 |
| 2,521,262 | Smith | Sept. 5, 1950 |

FOREIGN PATENTS

| | | |
|---|---|---|
| 268,504 | Great Britain | Apr. 7, 1927 |